(12) United States Patent
Forssell

(10) Patent No.: US 7,529,271 B2
(45) Date of Patent: May 5, 2009

(54) METHOD AND DEVICE FOR TRANSFERRING DATA OVER GPRS NETWORK

(75) Inventor: Mika Forssell, Espoo (FI)

(73) Assignee: Nokia Corporation, Espoo (FI)

( * ) Notice: Subject to any disclaimer, the term of this patent is extended or adjusted under 35 U.S.C. 154(b) by 781 days.

(21) Appl. No.: 10/687,209

(22) Filed: Oct. 16, 2003

(65) Prior Publication Data

US 2004/0120317 A1    Jun. 24, 2004

(30) Foreign Application Priority Data

Oct. 18, 2002    (FI)    .................................. 20021869

(51) Int. Cl.
  *H04J 3/16*    (2006.01)
  *H04J 3/22*    (2006.01)

(52) U.S. Cl. ....................................................... 370/469

(58) Field of Classification Search ................. 370/328, 370/469
See application file for complete search history.

(56) References Cited

U.S. PATENT DOCUMENTS

| | | | |
|---|---|---|---|
| 6,996,061 B2 * | 2/2006 | Yang et al. ................... | 370/233 |
| 2002/0032800 A1 * | 3/2002 | Puuskari et al. ............. | 709/246 |
| 2003/0060210 A1 * | 3/2003 | Ravishankar et al. ....... | 455/452 |
| 2008/0181170 A1 * | 7/2008 | Branlund et al. ............ | 370/328 |

FOREIGN PATENT DOCUMENTS

| | | |
|---|---|---|
| WO | WO 99/48310 A1 | 9/1999 |
| WO | WO 00/76230 A1 | 12/2000 |
| WO | WO 01/58095 A1 | 8/2001 |
| WO | WO 01/80518 A1 | 10/2001 |
| WO | WO 01/89241 A1 | 11/2001 |
| WO | WO 02/13471 A1 | 2/2002 |

* cited by examiner

*Primary Examiner*—Kevin C Harper
(74) *Attorney, Agent, or Firm*—Harrington & Smith, P.C.

(57) ABSTRACT

A method and device according to the present invention reorders Logical Link Control (LLC) Packet Data Units (PDUs) when user data is transferred over the radio interface between a Mobile Station (MS) and a packet data network. An objection of the present invention is to provide a method and system for transferring user data over a network ensuring the best quality of service characteristics.

58 Claims, 2 Drawing Sheets

METHOD AND DEVICE FOR TRANSFERRING DATA OVER GPRS NETWORK

TECHNICAL FIELD OF THE INVENTION

The present invention relates to transferring data over a radio interface in General Packet Radio System (GPRS) networks.

BACKGROUND OF THE INVENTION

In wireless telecommunication systems information is transferred over the radio interface between a transmitting and/or receiving communication device and a communication network. In General Packet Radio System (GPRS) networks, such as GPRS, Enhanced GRPS (EGPRS) and GSM Enhanced Data rate for Global Evolution (EDGE) Radio Access Network (GERAN) efforts has been made to improve the quality of the data transfer and thus the quality of service (QoS). The term GPRS also relates to EGPRS, GERAN and other enhancements of the GPRS in the present application.

A mobile station (MS), a base station sub-system (BSS) comprising a base transceiver station (BTS) and a base station controller (BSC) including a Packet Control Unit (PCU), and a serving GPRS support node (SGSN) are the main components of the GPRS architecture for communicating between a terminal device and the GPRS network. A gateway GPRS support node (GGSN) enables data transfer between the GPRS network and external data networks, such as an Internet. One or more GGSNs are connected to a SGSN via Internet Protocol (IP) based GPRS backbone network. When the MS communicates with external data networks, the GGSN operates as an IP router between a MS and the external network. Packet data channels (PDCH) are used as physical channels for the packet data transfer in the GPRS. To transfer user data, i.e. other data not produced by the GPRS protocols, a Packet Data Protocol (PDP) context is generated. All messages including PDP context messages are transferred using a Temporary Block Flow (TBF) between a MS and GPRS network.

The Logical Link Control (LLC) protocol is used to transfer data between a MS and a SGSN in the GPRS network. The technical specifications of the LLC layer protocol to be used for Packet Data Transfer (PDT) between a MS and SGSN are defined in the document 3GPP TS 44 064 V 4.3.0 (2002-03) [1]. The LLC layer is independent of the underlying radio interface protocol. The LLC protocol layer consists of Logical Link Management Entities (LLME), Logical Link Entities (LLE) and a multiplex procedure. A LLE is the LLC layer protocol state machine controlling one logical link connection.

The LLC layer operates above a Radio Link Control (RLC) layer on the MS side and above a Base Station Sub-system GPRS Protocol (BSSGP) layer on the SGSN side. Above the LLC layer is a SubNetwork Dependent Convergence (SNDC) protocol layer, that controls the transfer of user data Network layer Packet Data Units (N-PDU) between a MS and SGSN. Also above the LLC layer locates a GPRS Mobility Management (GMM) protocol layer, that uses the services of the LLC layer to transfer messages between a MS and a SGSN.

A MAC (Media Access Control) protocol layer locates under a RLC layer on the MS side. It defines the procedures that enable multiple MSs to share a common radio interface and it allows a MS to use several physical channels in parallel on the MS side of the GPRS network. The MAC also provides the arbitration between multiple MSs simultaneously attempting to access a radio interface.

A RLC/MAC layer protocol of the GPRS is described in the document 3GPP TS 44 060 V4.5.0 (2002-02) [2]. A R-LC/MAC block is a protocol data unit exchanged between RLC/MAC entities, and a RLC/MAC control block is a part of a RLC/MAC block carrying a control message between RLC/MAC entities or RLC data block is a part of a RLC/MAC block carrying user data or signaling data of upper layers. The RLC layer defines the procedures for segmentation and reassembly of LLC PDUs into RLC/MAC blocks and the RLC layer provides also link adaptation. The RLC/MAC is responsible for transmitting LLC PDUs over the radio interface using a Temporary Block Flow (TBF), which is a physical radio connection supporting the unidirectional transfer of LLC PDUs between a MS and the network. A LLC PDU contains user data or GPRS protocol related signaling messages, such as a GMM signaling message (GMM/SM). A MS may have an uplink TBF (UL TBF), a downlink TBF (DL TBF) or an uplink and downlink TBF established at any time. When a transfer mode of LLC PDUs terminates, in either uplink or downlink direction, the corresponding TBF is released and the MS returns to packet idle mode. When a transfer mode of LLC PDUs terminates but there exists an on-going LLC PDU transfer to the other direction, the MS stays in transfer mode.

One TBF may carry RLC data blocks only in one RLC mode at a time. This means that when transferring in-sequence LLC PDUs utilizing different RLC modes (ACK or UNACK), a previous TBF has to be released and a new TBF has to be established for a new RLC mode. The LLC is intended for use with both acknowledged (LLC ACK) and unacknowledged (LLC UNACK) data transfer and the RLC/MAC supports both the RLC ACK mode and RLC UNACK mode. The LLC modes and the RLC modes are independent from each other. In the LLC ACK mode the LLC provides a reliable service with in-order delivery but in the LLC UNACK mode the LLC does not guarantee in-order delivery. In RLC ACK mode RLC uses retransmissions to guarantee error-free transmission and in RLC UNACK mode retransmissions are not used. In both modes RLC/MAC specification says that upper layer PDUs shall be delivered in the order they are received from upper layers. In RLC UNACK mode one lost RLC data block may result in discarding of the whole LLC PDU at the receiving side. In the RLS ACK mode Backward Error Correction (BEC) procedures enable the selective retransmission of unsuccessfully delivered RLC/MAC blocks.

According to the Technical Specifications 3GPP TS 44 064 V 4.3.0 [1] the RLC shall deliver LLC PDUs received from the upper layers in the same order as they were received from the upper layers. This means that LLC PDUs are delivered in the same order as received from the upper layers (i.e. LLC layer), regardless of the fact that some LLC PDUs may have e.g. higher priority than other LLC PDUs. This is a big problem when transferring e.g. real-time or other delay sensitive data over the radio interface, because the data, despite its high priority, have to hold on the transmitting queue of in-order delivery. This may impair the QoS of the application.

The LLC allows data transfer with different service criteria, such that high-priority data transfers may take precedence over lower-priority data transfers to the same MS. A LLC PDU has certain QoS characteristics concerning the RLC mode, priority, throughput, etc. When streaming data or otherwise delay sensitive data, such as speech, is transferred over the GPRS network, it should be delivered before e.g. best effort data, such as FTP (File Transfer Protocol) data or web surfing, to ensure the QoS. Otherwise the service suffers bad quality. Recently an interest towards transferring delay sensitive data over the GPRS network is rising.

An example is now provided to describe the current state of the prior art. Assume that the RLC/MAC of the MS first receives three short LLC PDUs from a delay sensitive application that needs to be transmitted using the RLC UNACK mode. After this the RLC/MAC receives two long, e.g. 1500 octet each, LLC PDUs containing FTP data that needs to be transmitted using the RLC ACK mode. Then after this the RLC/MAC again receives three short LLC PDUs from the delay sensitive application that needs to be transmitted using the RLC UNACK mode. When changing a transfer mode from the RLC UNACK mode to the RLC ACK mode, first an existing TBF is released, then a new TBF is established and then FTP traffic LLC PDUs are transferred in RLC data blocks. After this a transfer mode is changed from the RLC ACK mode to the RLC UNACK mode again by releasing existing TBF and establishing new TBF, and then a transfer of data packets of the delay sensitive application may continue. A time needed to transfer FTP traffic LLC PDUs in the RLC data block depends on the number of assigned uplink PDCHs. The elapsed time also depends on a channel coding scheme used to transfer RLC data blocks over the radio interface and how frequently the TBF is assigned sending permissions. In this example, a transfer of two 1500 octet long LLC PDUs in the RLC ACK mode between the delay sensitive data packets may take several seconds. The gap of several seconds will result in that delay sensitive applications will substantially suffer from the FTP transfer.

The gap of several seconds will result in that a transfer of real time LLC PDUs of applications using streaming or otherwise delay sensitive data will be blocked by a transfer of non-real time LLC PDUs of applications using FTP or other best effort data according to the current specifications. In case of a speech application the quality of the conversation becomes unacceptable. From the foregoing it follows that the current GPRS network is unable to transfer delay sensitive data over the radio interface.

There are significant problems related to prior art to transfer delay sensitive data over the GPRS network. Grounds for the problems in prior art is the fact that a RLC/MAC does not interpret contents of a LLC PDU at all, and it only transfers a LLC PDU, such as received from a LLC, over a radio interface.

SUMMARY OF THE INVENTION

An objective of the present invention is to provide a method and system for transferring user data over a network ensuring the best quality of service characteristics.

The objective of the present invention is fulfilled by prioritising a packed user data message delivery according to a data content of a message and by associating the Packet Data Protocol (PDP) context to the radio interface access points via which the packed data message is transferred over the network.

In accordance with the present invention there is provided a method related to a mobile station for transferring user data in a wireless packet data network, wherein the method comprises the steps of:
  at a certain protocol layer, receiving a first packet data message from an upper protocol layer, which first packet data message belongs to a first packet data protocol (PDP) context characterised by certain first connection information,
  at said certain protocol layer, receiving a second packet data message from an upper protocol layer, which second packet data message belongs to a second packet data protocol (PDP) context characterised by certain second connection information,
  reordering said first packet data message and said second packet data message said certain protocol layer according to a relative urgency of transmission of said first and second packet data protocol (PDP) contexts, and
  delivering said first packet data message and said second packet data message further from said certain protocol layer in reordered order.

In accordance with the present invention there is provided a mobile station (MS) for transferring user data in a wireless packet data network, the mobile station (MS) comprising a transceiver for transmitting and receiving packet data messages, wherein the mobile station (MS) comprises:
  a controller configured to generate packet data protocol context activation messages for informing the network about the activation of packet data protocol (PDP) contexts for user data transmission, and
  a layered transmission protocol arrangement comprising a certain protocol layer entity as well as higher protocol layer entities, of which said certain protocol layer entity is configured to receive packet data messages belonging to different packet data protocol (PDP) contexts from at least one upper protocol layer, to reorder packet data messages received from at least one upper protocol layer according to a relative urgency of transmission of packet data protocol (PDP) contexts that the packet data messages belong to, and to deliver packet data messages further from said certain protocol layer in reordered order.

In accordance with the present invention there is provided a method related to a network element of a wireless network for transferring user data between a mobile station (MS) and a wireless packet data network, wherein the method comprising the steps of:
  at a certain protocol layer, receiving a first packet data message from an upper protocol layer, which first packet data message belongs to a first packet data protocol (PDP) context characterised by certain first connection information,
  at said certain protocol layer, receiving a second packet data message from an upper protocol layer, which second packet data message belongs to a second packet data protocol (PDP) context characterised by certain second connection information,
  reordering said first packet data message and said second packet data message at said certain protocol layer according to a relative urgency of transmission of said first and second packet data protocol (PDP) contexts, and
  delivering said first packet data message and said second packet data message further from said certain protocol layer in reordered order.

In accordance with the present invention there is provided a network element of a wireless network for transferring user data between a mobile station (MS) and a wireless packet data network, wherein network element comprises:
  a controller configured to generate packet data protocol (PDP) context activation messages for informing the network about the activation of packet data protocol (PDP) contexts for user data transmission, and
  a layered transmission protocol arrangement comprising a certain protocol layer entity as well as higher protocol layer entities, of which said certain protocol layer entity is configured to receive packet data messages belonging to different packet data protocol (PDP) contexts from at least one upper protocol layer, to reorder packet data messages received from at least one upper protocol layer according to a relative urgency of transmission of packet data protocol (PDP) contexts that the packet data messages belong to, and to deliver packet data messages further from said certain protocol layer in reordered order.

Some embodiments of the invention are described in the dependent claims.

BRIEF DESCRIPTION OF THE DRAWINGS

Next the present invention will be described in greater detail with reference to exemplary embodiments in accordance with the accompanying drawings, in which.

DETAILED DESCRIPTION

A preferred embodiment of the present invention is prioritising of Logical Link Control (LLC) Packet Data Units (PDUs) when user data is transferred over the radio interface between the Mobile Station (MS) and the GPRS network. According to the invention LLC PDUs are reordered based on their requirements.

According to one embodiment of the invention a Radio Link Control/Media Access Control (RLC/MAC) is able to reorder LLC PDUs inside a RLC/MAC and a LLC associates a Packet Data Protocol (PDP) context to a LLC Service Access Point Indicator (SAPI) intelligently. The present invention enables a LLC PDU to be prioritised in RLC/MAC and thus it enables applications to receive the quality of service (QoS) they need. Based on the additional QoS information received along the LLC PDU, RLC/MAC unit is able to prioritise LLC PDUs according to their urgency of transmission in relation to other LLC PDUs.

According to another embodiment of the invention LLC PDUs are reordered elsewhere than in a RLC/MAC.

In the following description reordering in a RLC/MAC is used as an example.

Figure 1:
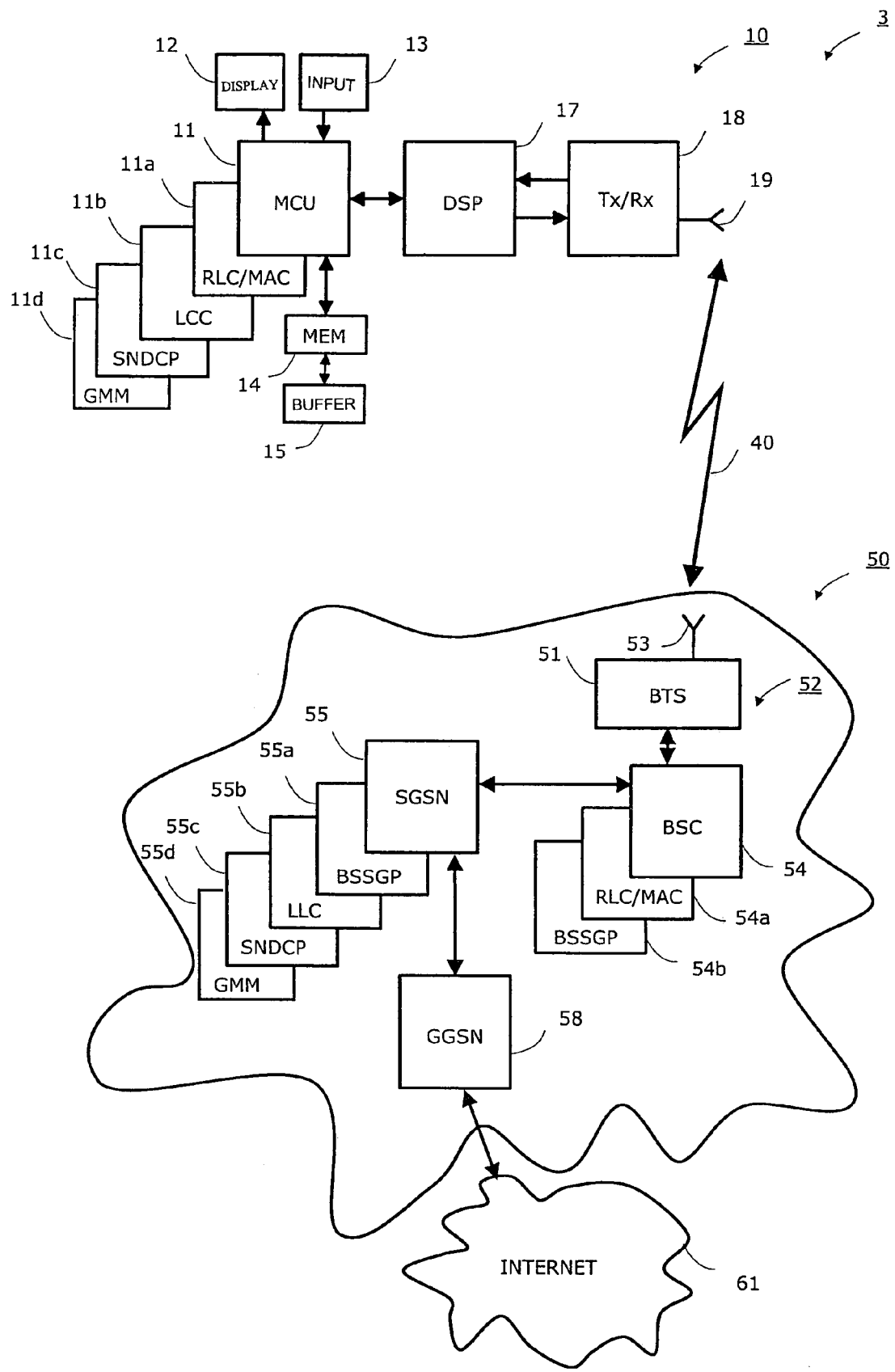
FIG. 1 illustrates a block diagram of a mobile station (MS) according to an embodiment of the present invention.

FIG. 1 shows a block diagram of an embodiment of wireless communication system 3 comprising at least one mobile station (MS) 10, a network 50 and a radio link connection 40 according to the present invention. On the network side of the wireless communication system 3 there is also illustrated in FIG. 1 a Serving General Packet Radio Service (GPRS) Support Node (SGSN) 55 provided by a wireless network operator, at least one base station controller (BSC) 54 including a Packet Control Unit PCU and at least one base transceiver station (BTS) 51 including antenna 53 to wirelessly communicate with the MS 10 over the radio interface in accordance with a predetermined radio interface specifications. A BTS 51 and BSC 54 are included to a Base Station Sub-system (BSS) 52. The radio interface 40 enables to transfer both voice and data traffic, including an Internet access and web browsing. At least one gateway GPRS support node (GGSN) 58, connected to a SGSN 55 via IP-based GPRS backbone, provides a connection to external data networks 61. According to the present invention the radio interface supports, but is not limited to, General Packet Radio System (GPRS) networks, such as GPRS, Enhanced GRPS (EGPRS), GSM (Global System for Mobile communications) Enhanced Data rate for Global Evolution (EDGE) Radio Access Network (GERAN) and any other enhancements of the GPRS or GSM or combinations thereof. The term GPRS relates to all those in this present application.

In FIG. 1 a MS 10 may be a handheld radiotelephone, such as a cellular phone, a personal communicator or alike. The MS 10 typically includes a microcontroller unit (MCU) 11 coupled to a display unit 12 and a keyboard unit 13 for a user interface (as well as a microphone and speaker). The MS 10 also contains a digital signal processor (DSP) 17 or equivalent, and a wireless transceiver unit 18 including transmitter, receiver and antenna 19 functions. The MCU 11 is connected to a memory 14 for storing an operation program, received packet data, packet data to be transmitted, and the like. In association with the memory 14 is a buffer unit 15 for storing packet data messages into a transfer queue and for delivering packet data messages from the buffer to provide an in-order delivery of packet data messages according to the present invention.

The memory 14 also includes a Read-Only Memory (ROM) which in association with the MCU 11 provides a Radio Link Control/Medium Access Control (RLC/MAC) unit 11a, a SubNetwork Dependent Convergence Protocol (SNDCP) unit 11c for user data transfer, a GPRS Mobility Management (GMM) unit 11d and a Logical Link Control (LCC) unit 11b to store a program enabling the MCU 11 to execute software routines, layers and protocols required to implement the methods according to the present invention. The SNDCP unit 11c and GMM unit 11c are locating on the same protocol layer. On the network 50 side in association with the BSC 54 are a RLC/MAC unit 54a and a BSSGP unit 54b, and in association with the SGSN 55 are a BSSGP unit 55a, a LLC unit 55b, a SNDCP unit 55c, and GMM unit 55d. Functional operation of these units is also controlled by software instructions from the network operator's premises. The SNDCP unit 55c and GMM unit 55d are locating on the same protocol layer.

In the GPRS network a packet data message is always transferred via a LLC layer which operates above RLC and BSSGP layers to provide logical links between a MS and its SGSN. Messages transferred via a LLC layer are called LLC packet data unit (LLC PDU) messages. Above a LLC layer is e.g. a SNDC protocol layer which controls the transfer of user data between a MS and SGSN. A data link connection of a LLC layer to provide services e.g. to the GMM and SNDC protocol layers is identified by a Service Access Point Identifier (SAPI) both on the SGSN and MS side. The SAPI is carried in the address field of the frame header of each LLC frame. LLC PDUs are segmented and reassembled into RLC/MAC blocks defined by a RLC layer. A TBF allocated on one or more PDCHs comprises a number of RLC/MAC blocks carrying one or more LLC PDUs. A TBF is temporary and is maintained only for a duration of the data transfer.

When LLC Packet Data Units (LLC PDU) are transferred between a MS 10 and BSS 52 and between a BSS 52 and SGSN 55 a LLC Relay provides services to the RLC layer protocol. An LLC layer connection is identified via Service Access Points (SAP) in the LLC layer. In case the RLC/MAC unit 54a of the network is located in the BSS 52, the LLC relay operates above the RLC/MAC. In case RLC/MAC unit is located in the SGSN, the LLC operates directly above the RLC/MAC. According to specifications [1] the RLC/MAC may be located in the network in the BTS, BSC or SGSN.

A SAP Identifier (SAPI) is used to identify a SAP on the SGSN side of the LLC interface and on the MS side of the LLC interface. In a LLC frame a SAPI includes an address field which is part of a frame header (LLC header). The SAPI identifies upper layer entity that receives a LLC PDU, e.g. a GMM, SMS, SNDCP. For example, if a SAPI is equal to 1 (SAPI=1), this LLC PDU goes to the GMM. A SAPI is also used as an internal LLC information in order to be able to handle PDUs with appropriate QoS characteristics. For example, when a SNDCP PDU using NSAPI (NSAPI is a PDP context ID) is received from a SNDCP, the PDU is transferred e.g. using the LLC SAPI=3 and during the PDP context activation procedure certain QoS characteristics have been associated to the PDP context.

Figure 2:
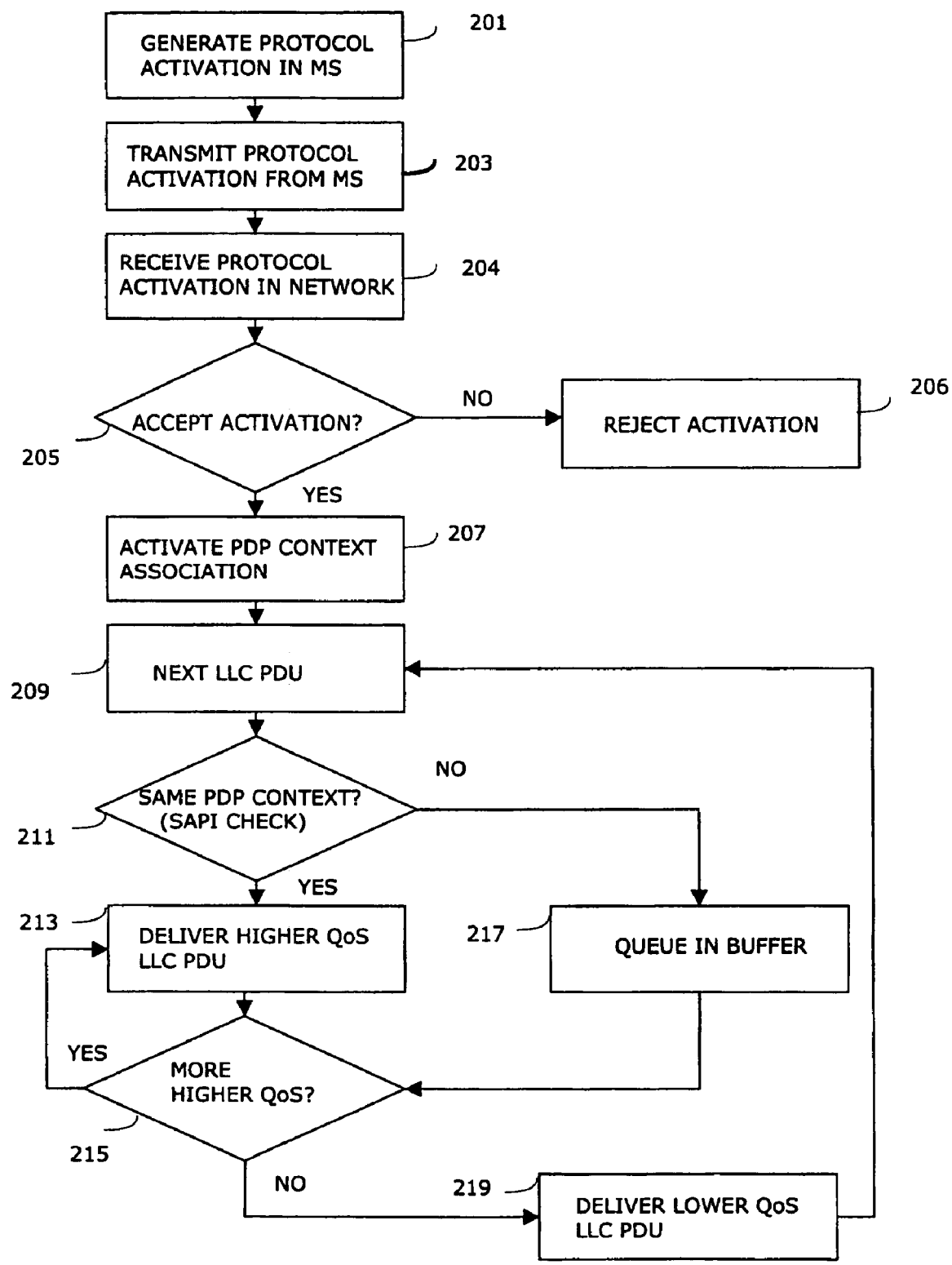
FIG. 2 illustrates a flow diagram of a method according to the present invention.

FIG. 2 shows a flow diagram of an embodiment of a method related to a mobile station (MS) for transferring user data in a wireless packet data network according to the present invention. The present invention improves a way to transfer real-time (RT) and otherwise delay sensitive data over radio interface between the MS and the SGSN enabling applications to receive service they need.

In step 201 the MS 10 generates a protocol activation message for informing the network to activate a packet data protocol (PDP) context for user data transmission. To do this, the GMM unit 11d generates a GMM/SM message "Activate PDP Context Request" and moves it to the LLC unit 11b to pack it to be a LLC PDU message. The LLC unit 11b associates a LLC PDU message to the LLC GMM SAPI and defines a LLC mode to be used to transfer the LLC PDU message. The LLC modes are a LLC ACK mode and LLC UNACK mode which are independent of a RLC mode. Then LLC unit 11b moves the LLC PDU message to the RLC/MAC unit 11a to transfer it over the network.

Then the MS 10 in step 203 sends to the network "Activate PDP Context Request" message. The RLC/MAC unit 11a transfers this LLC PDU message consisting a LLC header including a SAPI to the RLC/MAC unit 54a locating in the BSC 54 where it is transmitted to the SGSN 55 according to step 204. LLC unit 55b identifies the SAPI from the LLC header of the LLC PDU message. Then the LLC unit 55b moves a data content of the LLC PDU to the GMM/SM unit 55d according to the SAPI. Next, the GMM/SM unit 55d either accepts or rejects the request by transmitting a message "Activate PDP Context Accept" (step 205) or "Activate PDP Context Reject" (step 206). If the GMM/SM unit 55d accepts the PDP context activation, all information needed to route a user data is available to all GPRS network entities. E.g. a GGSN knows the IP address to be used and can route user data packets to the right SGSN serving the MS (GGSN is unaware of LLC). In association with activating PDP context QoS characteristics are also defined for the PDP context (and user data transferred using the PDP context).

When a PDP context is activated in step 207, the LLC unit 55b associates the PDP context to a LLC SAPI based on QoS requirements of the PDP context according to the Technical Specifications 3GPP TS 23.060 V 3.12.0 "General Packet Radio Service (GPRS); Service description" [3]. It says about multiplexing of N-PDUs from one or several NSAPIs onto one LLC SAPI that NSAPIs which are multiplexed onto the same SAPI shall use the same radio priority level, QoS traffic handling priority, and traffic class. This means that if a MS has two active PDP contexts, the PDP context transferring delay sensitive data and the PDP context transfering best effort data can't be associated to the same SAPI according to specifications. Thus, different PDP contexts shall use a different LLC SAPI and similar PDP contexts may use the same LLC SAPI. However in case of two quite similar PDP contexts, they may also be defined to use a different LLC SAPI in order to be able to reorder LLC PDUs belonging to different PDP contexts. An example: two streaming PDP contexts are activated, one carries voice and the other carries video. Usually if a video gets stuck for a while, it doesn't matter as much as if there's a break in voice. Therefore by prioritising voice over video in this case, we obtain better result.

When transferring user data a SNDCP unit 55c becomes active instead of a GMM unit 55d. In step 209 a SNDCP unit 55c receives a user data packet. Then it segments a user data packet and transfers it to the LLC unit 55b. The user data packet carries a NSAPI identifier of the PDP context. A NSAPI is one way to identify data belonging to different PDP context. Because a SNDCP and LLC share an internal interface, the LLC unit knows on the basis of the NSAPI to which LLC SAPI the user data packet must be connected. After this the LLC unit 55b packs the user data packet to a LLC PDU message containing the user data a LLC header and a frame check sequence (FCS). FCS is used to detect bit errors in the frame header and user data field. In this phase the LLC unit 55b labels the LLC PDU message with a LLC window number, on the basis on which a receiving LLC unit 11b can process the LLC PDU message properly. The LLC unit 55b then passes the LLC PDU message to the RLC/MAC unit 54a. The LLC PDU message contains information how the RLC/MAC unit has to process it. This information includes e.g. a RLC mode, throughput and priority information. According to this information RLC/MAC unit 54a is able to transfer the LLC PDU over the radio in appropriate way. A new TBF may not have to be established in case there already exists one.

Then in step 211 the RLC/MAC unit 54a reads a LLC SAPI from the LLC header of each LLC PDU message containing user data packets and reorders certain LLC PDU messages on the basis of the LLC SAPI. Based on LLC PDU a RLC/MAC unit is able to read which LLC SAPI the LLC PDU uses. Based on the additional QoS information received along the LLC PDU, RLC/MAC unit is able to prioritise LLC PDUs not utilizing the same LLC SAPI. The RLC/MAC unit doesn't know what kind of QoS characteristics are used for a certain LLC SAPI, but the information is received along the LLC PDU. When a PDP context has been associated to a certain LLC SAPI, all LLC PDUs associated to this PDP context are routed via LLC layer using this same LLC SAPI.

When RLC/MAC unit receives LLC PDU, the RLC/MAC checks if it has already buffered LLC PDUs (steps 211 and 217). In case there are buffered LLC PDUs and the received and the buffered LLC PDUs utilize different LLC SAPI or the same LLC SAPI but different LLC mode (ACK/UNACK), RLC/MAC is able to reorder the LLC PDUs according to their QoS requirements (steps 215). The LLC PDU with higher QoS information is transmitted (steps 213 and 215) before the LLC PDU with lower QoS information (step 219).

An example:

A RLC/MAC buffer 15 situation in the beginning: (head) SAPI=7, SAPI=7, SAPI=7 (tail)

A new LLC PDU with LLC SAPI=3 is received. According to QoS received along the LLC PDUs, if QoS of LLC PDU using SAPI=3 is higher than QoS of LLC PDUs using LLC SAPI=7, a RLC/MAC buffer looks like:

RLC/MAC buffer 15 situation: (head) SAPI=3, SAPI=7, SAPI=7, SAPI=7 (tail)

Otherwise if QoS of a LLC PDU using SAPI=3 is lower than QoS of LLC PDUs using LLC SAPI=7, a RLC/MAC buffer looks like:

RLC/MAC buffer 15 situation: (head) SAPI=7, SAPI=7, SAPI=7, SAPI=3 (tail)

The RLC/MAC unit 54a of the network indicates to the RLC/MAC unit 11a, and vice versa, if the RLC ACK mode or the RLC UNACK mode is to be used. When using RLC ACK mode the MS 10 can be sure that a transferred LLC PDU is received by the network 50. A transmitting RLC/MAC unit always tells a receiving RLC/MAC unit in association a TBF establishment which RLC mode is used to transfer LLC PDUs.

Throughput of RT data should be ensured and NRT data should be buffered in case there is RT data to be transmitted. An advantage of reordering LLC PDUs compared to the FTP example described in the background section of prior art is that RT data is transmitted before NRT data and thus RLC mode doesn't have to be changed in the middle of the TBF (TBF release and establishments) in case RT data and NRT data use different RLC mode.

If during data transfer LLC PDU using different RLC mode than the one used with existing TBF is received, MS/PCU 10, 54 shall check if the sending of the LLC PDU may be delayed and possibly if LLC PDUs may be reorganized. Only after transferring LLC PDUs having higher priority, the LLC PDUs using different RLC mode shall be transmitted.

In case RLC/MAC unit 54*a* has reorganized and delayed the transmission of LLC PDU transmission not carrying high priority data, RLC/MAC unit shall be able to determine when it may transmit the delayed LLC PDUs not carrying high priority data. There are three alternative ways to detect an end of a high priority data transfer:

One alternative is that after sending the last LLC PDU carrying high priority data RLC/MAC unit 54*a* starts transmitting LLC PDUs not carrying high priority data. As soon as new high priority data is received, RLC/MAC unit finishes the ongoing transmission of LLC PDU not carrying high priority data and after that continues transmission with LLC PDUs carrying high priority data. This alternative creates some delay between two subsequent high priority data packets, depending on the length and RLC mode of the LLC PDU not carrying high priority data.

Another solution to the problem is that after sending the last LLC PDU carrying high priority data RLC/MAC unit 54*a* starts a timer with short timeout value (e.g. 100-200 ms). If the timer expires and RLC/MAC unit hasn't received new high priority data, RLC/MAC is allowed to start transmission of LLC PDUs not carrying high priority data.

A third alternative is that the RLC/MAC unit 54*a* waits until high priority frames in RLC/MAC buffer 15 have been transmitted. In case RLC/MAC unit runs (temporarily) out of high priority data, RLC/MAC starts to transmit other LLC PDUs located in RLC buffer. If RLC receives new high priority data during transmission of low priority data, RLC/MAC unit could interrupt transmission of the current LLC PDU by generating LLC PDU border into RLC data block and continue transmitting LLC PDUs carrying high priority data in order to avoid delays in high priority data transmission. A downside of this solution is that a fake LLC PDU border might create confusion in LLC (however most likely LLC PDU CRC (FCS) checking would fail).

In the receiving end a SNDCP unit 11*c* receives a LLC PDU containing user data packet. Then it segments a user data packet and transfers it to the LLC unit 11*b*. LLC PDUs are buffered into the transfer queue 15 in association with the memory 14. When a LLC unit 55*b* sends a LLC PDU to peer LLC unit 11*b* via RLC/MAC, a LLC unit 11*b* receiving the transmitted LLC PDU checks that it receives LLC PDUs in-sequence order, what is needed not to break the operation of the LLC layer. This checking is based on a window number inside a LLC header of the LLC PDU. The window number is also used to check if received LLC PDU is a duplicate or a new LLC PDU. The window number increments by one (1) every time when a new LLC PDU is transmitted from LLC unit 11*b* to the RLC/MAC unit 11*a* and thus LLC unit 11*b* checks that the window number of a received LLC PDU also increments in-sequence order (1, 2, 3, . . . ). Each LLC SAPI has its own series of window numbers, i.e. LLC SAPI 1 has window numbers (1, 2, 3, . . . ), LLC SAPI 2 (1, 2, 3, . . . ), . . . , LLC SAPI 5 (1, 2, 3, . . . ), etc. In case the window number of the received LLC PDU increments in-sequence order, the LLC PDU is transferred to the transfer queue buffer 15. If the window number of the received LLC PDU (e.g. 1) was smaller than that of the previous LLC PDU (e.g. 50), i.e. the in-sequence order in not valid, the received LLC PDU may be discarded. The RLC/MAC unit 11*a* only transfers the LLC PDU message and it doesn't concern the contents of the LLC PDU message.

The MS 10 may also propose a LLC SAPI to be used with the PDP context but in any case the SGSN 55 determines a used LLC SAPI eventually.

A feature according to a method of the present invention may be implemented in a mobile station (MS) 10, in a Serving General Packet Radio Service (GPRS) Support Node (SGSN) 55, and in a Packet Control Unit (PCU) containing network RLC/MAC 61 in association with a Base Station Controller (BSC) 53 or a mobile switching center (MSC).

The invention is not restricted to the embodiments described above. While a preferred embodiment of the present invention is disclosed herein for purposes of explanation, numerous changes, modifications, variations, substitutions and equivalents in whole or in part should now be apparent to those skilled in art to which the invention pertains. Substitutions of elements from one described embodiment to another are also fully intended and contemplated. Accordingly, it is intended that the present invention be limited only the spirit and scope of the hereto appended claims.

What is claimed is:

1. A method comprising:
   at a radio link control/medium access control protocol layer, receiving at least one logical link control packet data unit from an upper protocol layer, wherein each logical link control packet data unit belongs to a certain packet data protocol context associated with logical link control connection information and wherein quality of service information relating to the logical link control connection information is defined for the certain packet data protocol context,
   reordering each logical link control packet data unit the radio link control/medium access control protocol layer according to a relative urgency of transmission of the logical link control packet data unit with respect to a buffered logical link control packet data unit based on at least the logical link control connection information and the quality of service information, and
   delivering the received logical link control packet data unit and the buffered logical link control packet data unit further from the radio link control/medium access control protocol layer in reordered order,
   wherein the method is performed by a mobile station to transfer user data in a wireless packet data network.

2. A method according to claim 1, further comprising, after receiving each logical link control packet data unit, determining whether the radio link control/medium access control protocol layer already comprises at least one buffered logical link control packet data unit.

3. A method according to claim 1, wherein the logical link control connection information of the received logical link control packet data unit and the logical link control connection information of the buffered logical link control packet data unit are different.

4. A method according to claim 1, wherein the logical link control connection information of the received logical link control packet data unit and the logical link control connection information of the buffered logical link control packet data unit are similar and the quality of service information of the received logical link control packet data unit and the quality of service information of the buffered logical link control packet data unit are different.

5. A method according to claim 1, further comprising, in response to the logical link control connection information of the received logical link control packet data unit and the logical link control connection information of the buffered logical link control packet data unit being similar and the quality of service information of the received logical link control packet data unit and the quality of service information of the buffered logical link control packet data unit being quite similar, changing the logical link control connection information of the received logical link control packet data unit.

6. A method according to claim 5, wherein the received logical link control packet data unit carries voice data and the buffered logical link control packet data unit carries video data.

7. A method according to claim 1, wherein at the upper protocol layer the logical link control connection information is used as internal logical link control information in order to handle the logical link control packet data unit with appropriate quality of service characteristics.

8. A method according to claim 1, Wherein the received logical link control packet data unit at the radio link control/medium access control protocol layer comprises a logical link control header which indicates at least one service access point indicator at the upper protocol layer and the radio link control/medium access control protocol layer reads the indicated service access point indicator.

9. A method according to claim 8, wherein the logical link control header further indicates a window number specific to the service access point indicator at the upper protocol layer and the window number is incremented by one when the upper protocol layer transmits the logical link control packet data unit to the radio link control/medium access control protocol layer.

10. A method according to claim 9, wherein the upper protocol layer receives each logical link control packet data unit from the radio link control/medium access control protocol layer in a sequence order according to the window number.

11. A method according to claim 1, wherein the logical link control connection information is a service access point indicator.

12. A method according to claim 5, wherein the logical link control connection information is changed to be an unused service access point indicator point indicator.

13. A method according to claim 1, wherein delivering further comprises buffering the received logical link control packet data unit into a packet data transfer queue for a period of time a current logical link control packet data unit delivery is on-going.

14. A method according to claim 1, wherein delivering further comprises, after ending transmission of a current logical link control packet data unit carrying a higher relative urgency of transmission, at the radio link control/medium access control protocol layer starts a timer with a predetermined timeout value and after the timer expires,. the radio link control/medium access control protocol layer initiates transmission of a logical link control packet data unit carrying a lower relative urgency of transmission if the radio link control/medium access control protocol layer has not received a new logical link control packet data unit message carrying a higher relative urgency of transmission during the predetermined timeout value.

15. A method according to claim 1, wherein delivering further comprises, during transmission of the current logical link control packet data unit carrying the lower relative urgency of transmission, interrupting the transmission by, the radio link control/medium access control protocol layer in response to the radio link control/medium access control protocol layer receiving a new logical link control packet data unit carrying a higher relative urgency of transmission, and initiates transmission of the new logical link control packet data unit carrying the higher relative urgency of transmission.

16. A method according to claim 15, wherein the logical link control packet data unit carrying the lower relative urgency of transmission is buffered by generating a logical link control packet data unit border into a radio link control data block.

17. A method according to claim 1, wherein the wireless packet data network is a general packet radio service Radio Service network.

18. A method according to claim 1, wherein the network element is one of a Serving General Packet Radio Support Node, a base station controller, mobile switching center and where a packet control unit comprises a radio link control/medium access control unit.

19. A method according to claim 1, wherein the quality of service information relates to a logical link control mode defined in the upper protocol layer.

20. A mobile station comprising a transceiver configured to transmit and receive packet data messages, a controller configured to generate packet data protocol context activation messages informing the network about the activation of packet data protocol contexts for transmission of at least one logical link control packet data unit comprising user data, each packet data protocol context defines logical link control connection information relating to an urgency of transmission, a layered transmission protocol-arrangement comprising a radio link control/medium access control protocol layer entity as well as higher protocol layer entities, of which the radio link control/medium access control protocol layer entity is configured to receive from at least one upper protocol layer logical link control packet data units, wherein each logical link control packet data unit belongs to a certain packet date protocol context associated with logical link control connection information and wherein quality of service information relating to the logical link control connection information is defined for the certain packet data protocol context, the radio link control/medium access control protocol entity is configured to reorder each received logical link control packet data unit from at least one upper protocol layer according to a relative urgency of transmission of logical link control packet data unit with respect to a buffered logical link control packet data unit based on at least the logical link control connection information and the quality of service information, and the radio link control/medium access control protocol entity is configured to deliver the received logical link control packet data unit and the buffered logical link control packet data unit further from the radio link control/medium access control protocol layer in reordered order.

21. A mobile station according to claim 20, wherein the mobile station is configured, in response to receiving a logical link control packet data unit, to determine whether the radio link control/medium access control protocol layer entity already comprises at least one buffered logical link control packet data unit.

22. A mobile station acc6rding to claim 20, wherein the logical link control connection information of the received logical link/control packet data unit and the logical link control connection information of the buffered logical link control packet data unit is different.

23. A mobile station according to claim 20, wherein the logical link control connection information of the received logical link control packet data unit and logical link control connection information of the buffered logical link control packet data unit are similar and the quality of service information of the received logical link control packet data unit and the quality of service information of the buffered l6gical link control packet data unit are different.

24. A mobile station according to claim 20, where the mobile station is configured, in response to the logical link control connection information of the, received logical link control packet data unit and the logical link control connection information of the buffered logical link control packet data unit being similar and the quality of service information of the received logical link control packet data unit and the quality of service information of the buffered logical link control packet data unit being quite similar, to change the logical link control connection information of the received logical link control packet data unit.

25. A mobile station according to claim 24, wherein the received logical link control packet data unit carries voice data and the buffered logical link control packet data unit carries video data.

26. A mobile station according to claim 20, wherein at the upper protocol layer entity is configured to use the logical link control connection information as an internal logical link control information in order to handle the logical link control packet data unit with appropriate quality of service characteristics.

27. A mobile station according to claim 20, wherein the received logical link control packet data unit at the radio link control/medium access control protocol layer entity comprises a logical link control header which indicates at least a service access s point indicator at the upper protocol layer entity and the radio link control/medium access control protocol layer entity is configured to read the service access point indicator.

28. A mobile station according to claim 27, wherein the logical link control header further indicates a window number specific for the service access point indicator at the upper protocol layer entity and the window number is incremented by one when the upper protocol layer entity transmits the logical link control packet data unit to the radio link control/medium access control protocol layer entity.

29. A mobile station according to claim 28, wherein the upper protocol layer entity receives each logical link control packet data unit from the radio link control/medium access control protocol layer entity in-sequence order according to the window number.

30. A mobile station according to claim 20, wherein the logical link control connection information is a service access point indicator.

31. A mobile station according to claim 24, wherein the logical link control connection information is changed to be an unused service access point indicator.

32. A mobile station according to claim 20, wherein the mobile station further comprises a buffer configured to buffer the received logical link control packet data unit into a packet data transfer queue for a period of time while a current logical link control packet data unit delivery is on-going.

33. A mobile station according to claim 20, wherein the mobile station further comprises a timer with a predetermined timeout value configured to start after ending transmission of the current logical link control packet data unit carrying the higher relative urgency of transmission.

34. A mobile station according to claim 20, wherein the radio link control/medium access control protocol layer entity is configured to interrupt a transmission of a current logical link control packet data unit carrying a lower relative urgency of transmission in response to receiving a new logical link control packet data unit carrying, a higher relative urgency of transmission during the transmission.

35. A mobile station according to claim 34, wherein the radio link control/medium access control protocol layer entity is configured to buffer the logical link control packet data unit carrying the lower relative urgency of transmission by generating a logical link control packet data unit border into a radio link control data block.

36. A mobile station according to claim 20, wherein the wireless packet data network is a general packet radio service network.

37. A mobile station according to claim 20, wherein the quality of service information relates to logical link control mode defined in the upper protocol layer entity.

38. A network element comprising:
a controller configured to generate packet data protocol context activation messages configured to inform a network about activation of packet data protocol context for user data transmission,
a layered transmission protocol arrangement comprising a radio link control/medium access control protocol layer entity and higher protocol layer entities,
where the radio link control/medium access control protocol layer entity is configured:
to receive logical link control packet data units from at least one upper protocol layer wherein each logical link control packet data unit belongs to a certain packet data protocol context associated with logical link control connection information and wherein quality of service information relating to the logical link control connection information is defined for the certain packet data protocol context,
to reorder each received logical link control packer data unit from at least one upper protocol layer according to a relative urgency of transmission of the logical link control packet data unit with respect to a buffered logical link control packet data unit based on at least the logical link control connection information and the quality of service information, and
to deliver the received logical link control packet data unit and the buffered logical link control packet data unit further from the radio link control/medium access control protocol layer in reordered order.

39. A network element according to claim 38, wherein the controller is further configured to receive an uplink temporary block flow and, in response to receiving the uplink temporary block flow, to configure the packet data protocol context activation messages.

40. A network element according to claim 38, wherein the controller is further configured to determine, during reception, whether the logical link control packet data units are received in-sequence order according the logical link control connection information of The logical link control packet data units.

41. A network element according to claim 38, wherein after receiving each logical link control packet data unit, the network element is configured to determine whether the radio link control/medium access control protocol layer entity already comprises at least one buffered logical link control packet data unit.

42. A network element according to claim 38, wherein the logical link control connection information of the received logical link control packet data unit and the logical link control connection information of the buffered logical link control packet data unit are different.

43. A network element according to claim 38, wherein the logical link control connection information of the received logical link control packet data unit and the logical link control connection information of the buffered logical link control packet data unit are similar and the quality of service information of the received logical link control packet data unit and the quality of service information of the buffered logical link control packet data unit are different.

44. A network element according to claim 38, wherein the network element is further configured, in response to the logical link control connection information of the received logical link control packet data unit and the logical link control connection information of the buffered logical link control packet data unit being similar and the quality of service information of the received logical link control packet data unit and the quality of service information of the buffered logical link control packet data unit being quite similar, to change the logical link control connection information of the received logical link control packet data unit.

45. A network element according to claim 38, wherein at the upper protocol layer entity is configured to use the logical link control connection information as an internal logical link control information in. order to handle the, logical link control packet data, unit with appropriate quality of service characteristics.

46. A network element according to claim 38, wherein the received logical link control packet data unit at the radio link control/medium access control protocol layer entity comprises a logical link control header which indicates at least a service access point indicator at the upper protocol layer entity and the radio link control/medium access control protocol layer entity is configured to read the service access point indicator.

47. A network element according to claim 46, wherein the logical link control header further indicates a window number specific for the service access point indicator at the upper protocol layer and the window number is incremented by one when the upper protocol layer entity transmits the logical link control packet data unit to the radio link control/medium access control protocol layer entity.

48. A network element according to claim 47, wherein the upper protocol layer entity is configure to receive each logical link control packet data unit from the radio link control/medium access control layer entity in-sequen6e order according to the window number.

49. A network element according to claim 38, wherein the logical link control connection information is a service access point indicator.

50. A network element according to claim 44, wherein the logical link control connection information is changed to be an unused service access point indicator.

51. A network element according to claim 38, wherein the network element further comprises a buffer configured to buffer the received logical link control packet data unit into a packet data transfer queue for a period of time while a current logical link control packet data unit delivery is on-going.

52. A network element according to claim 38, wherein the network element further comprises a timer with a predetermined timeout value configured to begin in response to ending transmission of a current logical link control packet data unit carrying a higher relative urgency of transmission.

53. A network element according to claim 38, wherein the radio link control/medium access control protocol layer entity is configured to interrupt the transmission of a current logical link control packet data unit carrying a lower relative urgency of transmission in response to receiving a new logical link control packet data unit carrying a higher relative urgency of transmission during the transmission of the current logical link control packet data unit.

54. A network element according to claim 53, wherein the radio link control/medium access control protocol layer entity is configured to buffer the logical link control packet data unit carrying the lower relative urgency of transmission by generating a logical link control packet data unit border into a radio link control data block.

55. A network element according to claim 38, wherein the wireless packet data network is a general packet radio service network 56. A network element according to claim 38, wherein the network element is one of the following network elements: a serving general packet radio support node, a base station controller, mobile switching center and a packet control unit comprising a radio link control/medium access control unit.

57. A network element according to claim 38, wherein the quality of service information relates to a logical link control mode defined by the upper protocol entity.

58. A method comprising:
    at a radio link control/medium access control protocol layer, receiving at least one logical link control packet data unit from an upper protocol layer, wherein each logical link control packet data unit belongs to a certain packet data protocol context associated with logical link control connection information and wherein quality, of service quality of service information relating to the logical link control connection information is defined for the certain packet data protocol context,
    reordering each logical link control packet data unit at the radio link control/medium access control protocol layer according to a relative urgency of transmission of the logical link control packet data unit with respect to a buffered logical link control packet data unit based on at least the logical link control connection information and the quality of service information; and
    delivering the received logical link control packet data unit and the buffered logical link control packet data unit further from the radio link control/medium access control protocol layer in reordered order,
    wherein the method is performed by a network element of a wireless packet data network.

* * * * *

UNITED STATES PATENT AND TRADEMARK OFFICE
CERTIFICATE OF CORRECTION

| | | |
|---|---|---|
| PATENT NO. | : 7,529,271 B2 | Page 1 of 1 |
| APPLICATION NO. | : 10/687209 | |
| DATED | : May 5, 2009 | |
| INVENTOR(S) | : Mika Forssell | |

It is certified that error appears in the above-identified patent and that said Letters Patent is hereby corrected as shown below:

In Claim 20, Column 12, line 49, delete "date" and replace with --data--.

In Claim 23, Column 13, line 18, delete "16gical" and replace with --logical--.

In Claim 27, Column 13, line 46, delete "s".

In Claim 38, Column 14, line 49, delete "packer" and replace with --packet--.

In Claim 45, Column 15, line 37, delete "in." and replace with --in--.

In Claim 45, Column 15, line 37, delete "the," and replace with --the--.

In Claim 45, Column 15, line 38, delete "data," and replace with --data--.

In Claim 48, Column 15, line 56, delete "configure" and replace with --configured--.

In Claim 48, Column 15, line 58, delete "in-sequen6e" and replace with --in-sequence--.

Signed and Sealed this

Thirtieth Day of June, 2009

JOHN DOLL
*Acting Director of the United States Patent and Trademark Office*